United States Patent
Yamada et al.

Patent Number: 6,143,207
Date of Patent: Nov. 7, 2000

[54] WIDE-RANGE THERMISTOR MATERIAL AND METHOD FOR PRODUCING IT

[75] Inventors: Katsunori Yamada; Mitsuru Asai; Nobuo Kamiya; Yuko Matsubara, all of Aichi, Japan

[73] Assignee: Kabushiki Kaisha Toyota Chuo Kenkyusho, Aichi-gun, Japan

[21] Appl. No.: 09/068,551

[22] PCT Filed: Sep. 16, 1997

[86] PCT No.: PCT/JP97/03271

§ 371 Date: May 18, 1998

§ 102(e) Date: May 18, 1998

[87] PCT Pub. No.: WO98/12714

PCT Pub. Date: Mar. 26, 1998

[30] Foreign Application Priority Data

Sep. 18, 1996 [JP] Japan .................................. 8-269406
Sep. 25, 1996 [JP] Japan .................................. 8-275396

[51] Int. Cl.⁷ ............................ H01B 1/08; H01C 7/10
[52] U.S. Cl. .................................. 252/515.1; 252/521.3; 252/519.5; 252/520.2; 252/521.1; 252/521.5; 338/22 R; 264/617
[58] Field of Search ........................ 252/516, 518.1, 252/521.3, 521.5, 519.5, 519.51, 521.1, 520.2; 338/22 R; 264/614, 616, 617

[56] References Cited

U.S. PATENT DOCUMENTS

| | | | |
|---|---|---|---|
| 4,110,260 | 8/1978 | Yamamoto et al. | 252/519 |
| 4,906,968 | 3/1990 | Gershenfeld et al. | 338/25 |
| 5,637,543 | 6/1997 | Iwaya et al. | 501/152 |

FOREIGN PATENT DOCUMENTS

| | | |
|---|---|---|
| 2643131 | 9/1976 | Germany . |
| 52151891 | 12/1977 | Japan . |
| 53-27480 | 8/1978 | Japan . |
| 60-18081 | 5/1985 | Japan . |
| 62-4750 | 1/1987 | Japan . |
| 1252582 | 10/1989 | Japan . |
| 3-268303 | 11/1991 | Japan . |
| 3268303 | 11/1991 | Japan . |
| 4-6803 | 1/1992 | Japan . |
| 46803 | 1/1992 | Japan . |
| 461832 | 10/1992 | Japan . |
| 4348237 | 12/1992 | Japan . |
| 562805 | 3/1993 | Japan . |
| 6163206 | 6/1994 | Japan . |
| 6283310 | 10/1994 | Japan . |
| 774104 | 8/1995 | Japan . |
| 8191001 | 7/1996 | Japan . |
| 08273904 | 10/1996 | Japan . |
| 8273904 | 10/1996 | Japan . |
| 96/05151 | 2/1996 | WIPO . |

*Primary Examiner*—Mark Kopec
*Attorney, Agent, or Firm*—Oblon, Spivak, McClelland, Maier & Neustadt, P.C.

[57] ABSTRACT

Provided are wide-range thermistor materials with high responsibility, which have linear resistance temperature characteristics and a large rate of temperature-dependent resistance change in wide temperature range of from lower than room temperature to higher than 1000° C. The thermistor material comprises an electrically-insulating ceramic matrix and second phase grains as discontinuously dispersed in the matrix, in which the second phase grains are of a semiconductive or conductive substance having a large rate of temperature-dependent resistance chance. The material may optionally contain a resistance-controlling additive of one or more of nitrides, borides, silicides, sulfides, oxides and carbide of elements, third phase grains with internal stress-relaxing ability having a lower modulus of elasticity than the matrix and the second phase grains, and a resistance stabilizer of $TiO_2$ and/or $Ti_nO_{2n-1}$ (n=4 to 9).

37 Claims, 4 Drawing Sheets

WIDE-RANGE THERMISTOR MATERIAL AND METHOD FOR PRODUCING IT

TECHNICAL FIELD

The present invention relates to a thermistor material and a method for producing it. More precisely, the invention relates to a wide-range thermistor material and a method for producing it.

BACKGROUND ART

Thermistor materials are those for resistors which are sensitive to temperature and of which the resistance varies depending on temperature, and the materials are used, for example, in various temperature sensors, fuel level gauges, switching powers, humidity sensors and anemometers.

Temperature sensors comprising conventional thermistor materials are problematic in that they are applicable to limited temperature range. For example, oxides of Mn, Co, Ni and Fe are used in low-temperature range sensors (from −30° C. to 300° C. or so); MnO—NiO—$Cr_2O_3$—$ZrO_3$, SiC, and $MgAl_2O_4$—$Cr_2O_3$ are in middle-temperature range sensors (from 200° C. to 800° C. or so); and $ZrO_2$—$Y_2O_3$, and MgO—$Al_2O_3$—$Cr_2O_3$—$Fe_2O_3$ are in high-temperature range sensors (from 700° C. to 1200° C. or so). For wide-range use, a plurality of those temperature sensors of different thermistors applicable to different temperature ranges must be used in combination.

To solve the problems in the prior art, various techniques have heretofore been proposed. One is "a high-temperature range thermistor" comprising a composite oxide of NiO—MgO in which NiO is from 30 to 99.9% by weight and MgO is from 0.01 to 70% by weight (see Japanese Patent Application Laid-Open No. 6-163206). They say that the high-temperature range thermistor exhibits wide-range temperature-dependent resistance changes, while indicating different resistance values and B constants varying in wide range, and has good direct current load life characteristics at high temperatures.

Another is "a high-temperature range thermistor" which comprises a sintered material of a mixture of (Mn•Cr)$O_4$ spinel having a high resistance value and a high temperature coefficient of resistance, and $YCrO_3$ having a low temperature coefficient of resistance, and of which the resistance value and the temperature coefficient of resistance are variable in wide range (see Japanese Patent Application Laid-Open No. 5-62805). They say that the high-temperature range thermistor has a lot of latitude for its resistance value and its temperature coefficient of resistance.

Still another is "a high-temperature range, ceramic thermistor material" which comprises a perovskite-structured ceramic material such as $LaAlO_3$ or $LaCrO_3$ and which is used in high temperature range of 300° C. or higher (see Japanese Patent Publication No. 53-27480).

Still another is a "temperature sensor" comprising a solid solution of P-type conductive $Cr_2O_3$ and N-type conductive $Fe_2O_3$ in corundum-structured, high-resistance $Al_2O_3$ (see Japanese Patent Application Laid-Open No. 6-283310). They say that the sensor can detect temperatures falling between 300° C. and 1000° C., and that, since the crystal of the solid solution constituting the sensor comprises both the P-type substance and the N-type substance, the time-dependent variation in the electrical resistance value of the sensor is small at the elevating temperature in the long time.

Still another is "a method for producing multi-functional ceramics", which comprises a step of mixing a granular material that comprises a ceramic powder and a powdery substance that is finer than the granular material with rolling them to thereby make the surfaces of the grains of the granular material uniformly (and completely) coated with the powdery substance, and a step of compacting the powdery substance-coated, granular material into a green body, followed by sintering the green body (see Japanese Patent Publication No. 7-74104).

Still another is "an electric resistor" which is composed of, as a whole, a nitride selected from a group consisting of silicon nitride, aluminium nitride, boron nitride and their mixtures, silicon carbide and molybdenum disulfide (see Japanese Patent Publication No. 4-61832).

Still another is "a positive-temperature-coefficient composition and a method for producing it" in which is formed a composition having a three-dimensional, continuous micro-network structure of short carbon fibers having a mean length of from 0.005 to 1 mm and a diameter of from 3 to 20 $\mu$m in a crystalline polymer matrix for ensuring efficient current-carrying path chains therethrough (see Japanese Patent Application Laid-Open No. 62-4750). They say that the polymer composition has good PTC characteristics, and that, since the amount of the short carbon fibers to be in the composition is small, the composition is produced at low costs.

Still another is a sintered "electroconductive ceramic composite" comprising a ceramic phase selected from an insulating ceramic phase, a semiconductive ceramic phase and their mixtures, and an at least partly continuous, electroconductive substance phase, in which the ceramic phase is composed of compound granules having a granular size of at least 30 $\mu$m (see Japanese Patent Publication No. 60-18081). They say that the ceramic composite, as comprising those different materials, can be made to have any desired positive and negative characteristics which are not only non-linear but also linear, depending on the kinds of the constituent two materials and on the ratio of the two, and that the ceramic composite can be made to have any desired electroconductivity.

However, the high-temperature range thermistor disclosed in Japanese Patent Application Laid-Open No. 6-163206, of which the resistance value is increased by the mere addition of the insulating substance, MgO to the electroconductive NiO matrix, is problematic in that its temperature-resistance characteristics greatly depend on the temperature-resistance characteristics of NiO itself, resulting in that its electric resistance value R relative to the ambient temperature T varies in accordance with the same exponential function as that for conventional NiO thermistors, and therefore the NiO—MgO thermistor disclosed is difficult to use in wide-range temperature detection. In addition, the NiO—MgO composite thermistor requires a large amount of MgO for controlling its resistance value and B constant, and is therefore further problematic in that its controllability is poor.

The high-temperature range thermistor disclosed in Japanese Patent application Laid-Open No. 5-62805 involves the same problems as those with the high-temperature range thermistor disclosed in No. 6-163206.

The high-temperature range thermistors disclosed in Japanese Patent Publication No. 53-27480 and Japanese Patent Application Laid-Open No. 6-283310 are not applicable to wide-range temperature detection for the range of from lower than room temperature to higher than 1000 ° C.

In addition, as having poor weather resistance, those thermistors are shielded with protectors (caps), and are therefore problematic in that their reactivity is poor and that the production costs for them are high.

In the method for producing multi-functional ceramics as disclosed in Japanese Patent Publication No. 7-74104, the surfaces of the grains constituting the granular material are completely covered with the fine powdery substance, resulting in that the temperature-resistance characteristics of the thus-formed ceramic composite are greatly influenced by those of the powdery substance and therefore could not be linear in wide temperature range. The technique disclosed in Japanese Patent Publication No. 4-61832 involves the same problems as in No. 7-74104. In addition, it is further problematic in that the electric resistor provided has a small rate of temperature-dependent resistance change, that it requires a large amount of SiC or $MoS_2$ in order to control its temperature-resistance characteristics, and that its characteristics are often changed from n-type ones to p-type ones, or from p-type ones to n-type ones.

In the positive-temperature-coefficient composition and the method for producing it as disclosed in Japanese Patent Application Laid-Open No. 62-4750, formed is a three-dimensional network structure of continuous short carbon fibers. Accordingly, the composition produced therein is problematic in that its temperature-resistance characteristics are defined by the temperature-electricity characteristics of carbon in the composition and therefore the composition is difficult to control for its rate of temperature-dependent resistance change. In addition, since the composition comprises a polymer and carbon fibers, it could not be used in air in high temperature range of 300° C. or higher. Thus, the composition is further problematic in that it is applicable to narrow-range temperature detection in limited atmospheres.

The electroconductive ceramic composite disclosed in Japanese Patent Publication No. 60-18081, in which the electroconductive substance comprises a partially or wholly continuous phase of compound grains, is problematic in that its temperature-resistance characteristics greatly depend on the characteristics of the electroconductive substance existing in the composite, and therefore the composite could hardly exhibit linear resistance changes in wide temperature range.

One object of the present invention is to provide a high-responsible, wide-range thermistor material, which has a linear and large rate of temperature-dependent resistance change in wide temperature range of from lower than 0° C. to higher than 1000° C.

Another object of the invention is to provide a method for producing such a high-responsible, wide-range thermistor material having a linear and large rate of temperature-dependent resistance change in wide temperature range.

DISCLOSURE OF THE INVENTION

We, the present inventors have specifically noted a thermistor material that comprises a ceramic composite composed of a ceramic matrix and second phase materials as dispersed in the matrix, in which the second phase materials are dispersed in the ceramic material in a discontinuous condition and in such an amount that makes the ceramic composite have a specific resistance of from $10^6$ to $10^7$ $\Omega$cm, or that is, in such a manner that the second phase grains are arranged in the ceramic composite at intervals falling within a predetermined range without being kept in contact with each other and that those arrangements are in a sequential condition. In this, however, the second phase particles may be kept in partial contact with each other. In that condition, it is believed that the electric resistance value of the thermistor is determined by (a) the resistance value of the second phase materials themselves, and (b) the resistance value to be derived from the electroconductive phenomena appearing in the discontinuous part in the ceramic composite, such as the tunnel effect and hopping conduction in that part (that is, the resistance value of the distance between the second phase particles, and the electric resistance value of the matrix and/or the third or other phases existing between the second phase particles, and further the internal stress to be derived from the difference in the thermal expansion between the matrix and the second phase particles). It is further believed that the electric resistance value (absolute value) of the composite is influenced more by (b) than by (a), or that is, it depends on the distance between the second phase particles and on the internal stress (residual stress). Since the distance between the second phase particles and the internal stress uniformly vary with the increase in temperature, it is believed that the electric resistance value of (b) also uniformly varies in wide temperature range. If the matrix and the second phase particles constituting the ceramic composite for the thermistor material have high heat resistance, the thermistor made of the material is applicable to wide-range temperature detection for at highest up to about 1400° C.

On the other hand, like NTC thermistors, if the thermistor is applied to accurate temperature detection from the change in its resistance (or voltage), it must have a much greater rate of temperature-dependent resistance change (to be represented by the ratio of the electric resistance at a highest working temperature to that at a lowest working temperature). The rate of temperature-dependent resistance change of the thermistor (of the ceramic composite), when having the same composition, greatly depends on that in the second phase materials themselves. Therefore, in order to make the thermistor having the same composition having a greater rate of temperature-dependent resistance change, it is important to selectively use second phase materials having a greater rate of temperature-dependent resistance change to disperse in the ceramic composite.

By changing the combination of the matrix and/or the material to be the third and other phases, and the second phase materials, it is possible to change the difference in the thermal expansion between those materials, thereby controlling the rate of temperature-dependent resistance change of the ceramic composite. Depending on the difference in the thermal expansion between the matrix and the second phase materials to be combined to form the thermistor material, the temperature-dependent variation in the distance between the second phase materials and that in the internal stress vary, and therefore, the resistance value of the thermistor itself and/or the rate of temperature-dependent resistance change of the thermistor shall be thereby varied. Accordingly, the combination of a suitable matrix and suitable second phase materials, between which the difference in the thermal expansion is an intended one, gives a composite material having a predetermined rate of temperature-dependent resistance change.

The wide-range thermistor material of the first aspect of the invention comprises a matrix comprising an electrically-insulating ceramic and second phase materials as discontinuously dispersed in the matrix, in which the second phase materials are semiconductive or conductive ones and have a great rate of temperature-dependent resistance change.

In the wide-range thermistor material of the second aspect of the invention, the second phase materials are dispersed in the matrix in such a manner that they surround the matrix aggregates as formed through aggregation of a plurality of crystalline matrix grains.

The wide-range thermistor material of the third aspect of the invention additionally comprises at least one third phase substance, of which the modulus of elasticity is lower than that of the matrix and the second phase materials and which is dispersed in the material in such a manner that the third phase is continuously in connection to at least any interface between the second phase materials and/or between the matrix and the second phase materials.

The wide-range thermistor material of the fourth aspect of the invention additionally comprises at least one additive (except the third phase substance) selected from nitrides, borides, silicides, sulfides, oxides and carbides of elements of Group IVa to Group VIa and Group IIb to Group Vb, as discontinuously dispersed in the matrix materials along with the second phase materials.

In the wide-range thermistor material of the fifth aspect of the invention, the second phase materials and the additive selected from nitrides, borides, silicides, oxides, sulfides and carbides of elements of Group IVa to Group VIa and Group IIb to Group Vb are all discontinuously dispersed in the third phase.

The wide-range thermistor material of the sixth aspect of the invention comprises $TiO_2$ and/or $Ti_nO_{2n-1}$ (n=4 to 9) as the resistance stabilizer.

The method for producing the wide-range thermistor material of the seventh aspect of the invention comprises;

- a step of mixing an insulating ceramic powder and a sintering aid to prepare a matrix powder;
- a step of granulating the powder into granules having a particle size of from 5 to 500 $\mu$m;
- a step of mixing a semiconductive or conductive, second phase material powder and at least one semiconductive or conductive additive selected from nitrides, borides, suicides, sulfides, oxides and carbides of elements of Group IVa, Group Va, Group VIa, and Group IIb to Group Vb, and their composite compounds to prepare a composite powder;
- a step of mixing the granulated matrix powder and the composite powder, or surrounding the granules of the granulated matrix powder with the composite powder to prepare a mixture powder; and
- a step of shaping and sintering the mixture powder.

The method for producing the wide-range thermistor material of the eighth aspect of the invention comprises;

- a step of mixing a semiconductive or conductive, second phase material powder and an insulating ceramic matrix powder optionally along with a sintering aid to prepare a composite powder, in which the particle size of the grains of the former second phase powder is not larger than ½ of that of the starting powder of the latter matrix powder; and
- a step of shaping and sintering the composite powder, in which the sintering pattern may additionally comprise heat treatment for growing the matrix crystal grains.

Though being not completely clarified as yet, the mechanism of the excellent effect of the wide-range thermistor material of the first aspect of the invention may be considered as follows:

The thermistor material of the first aspect comprises the second phase materials as discontinuously dispersed in the electrically-insulating matrix. Therefore, the resistance value of the thermistor material linearly changes in wide temperature range, depending on the temperature-dependent resistance change in the distance between the second phase materials and in the internal stress of the material and/or on the temperature-dependent resistance change in the substances existing between the second phase particles. Where the matrix constituting the thermistor material has high heat resistance and corrosion resistance, the thermistor of the material can be directly put in ambient gas (e.g., reducing gas, inert gas), without being provided with a protector, for use in temperature detection. Therefore, not only the thermistor of the invention has high responsibility but also its production cost is lowered and its structure is simplified.

The second phase materials are of a semiconductive or conductive substance having a great rate of temperature-dependent resistance change [this is represented by (electric resistance value at the lowest temperature in temperature detection range)/(resistance value at the highest temperature in temperature detection range)]. Accordingly, the influence of the temperature-resistance characteristics of the second phase materials themselves on the thermistor material comprising the grains is enlarged, whereby the thermistor material shall have a great rate of temperature-dependent resistance change in wide temperature range.

The linear temperature-resistance characteristics of the thermistor material of the invention are derived from the discontinuous dispersion structure of the second phase materials in the material, and therefore hardly depend on the material composition of the composites. Therefore, the thermistor material of the invention is characterized in that it may have any favorable compositional combination of the constituent materials in accordance with the condition in its practical use and with any other requirements of mechanical properties for the material strength, etc.

If the second phase materials are continuously dispersed in the matrix, the resulting composite material is not different from conventional thermistor materials, and could not have linear temperature-resistance characteristics in wide temperature range, like conventional thermistor materials. This is because the temperature-dependent resistance change characteristics of the composite material depend on the temperature-resistance characteristics of the second phase materials constituting the material. PTC thermistors are known, in which the second phase particles are continuously dispersed in the matrix. When the known PTC thermistors are heated up to predetermined temperatures or higher, the contact between the second phase grains is broken whereby the resistance value of the thermistor stepwise increases. Therefore, those known PTC thermistors are unfavorable as NTC thermistors for temperature detection. Precisely, when the second phase grains are continuously dispersed in the insulating matrix, as in the known PTC thermistors, the resulting composite material is not different from conventional thermistor materials, and could not have linear temperature-resistance characteristics in wide temperature range, like conventional thermistor materials. This is because the temperature-dependent resistance change characteristics of the composite material depend on the temperature-resistance characteristics of the second phase particles constituting the material.

In the matrix constituting the thermistor material of the second aspect of the invention, the matrix units (aggregates) are formed through aggregation of a plurality of crystalline matrix grains, and their size is preferably between 1 $\mu$m and 500 $\mu$m. This embodiment is advantageous in that even a small amount of the second phase materials added to the matrix can form uniform electric conductive paths in the composite material and that the temperature-resistance characteristics of the composite material are stabilized.

The thermistor material of the third aspect of the invention comprises the additional third phase (with electric insulating performance), in which the third phase is effective in relaxing any excessive internal stress to be generated by the difference in the thermal expansion between the constituent components, while functioning as a buffer phase. Therefore, the thermistor material of the third aspect favorably has stable temperature-resistance characteristics with no hysteresis. Where the composition of the third phase is so selected that it may be a phase of bonding the matrix and the second phase materials via it, the thus-selected third phase is additionally effective in controlling the dispersion of the second phase materials to thereby improve the durability of the material with increasing its instant breaking strength, impact resistance, thermal fatigue-resistant characteristic and mechanical fatigue-resistant characteristic.

By varying the composition and also the thickness (amount) of the third phase, it is possible to control the electric resistance value between the second phase materials, the temperature-resistance characteristics of the composite material and even the rate of temperature-dependent resistance change of the material.

In the thermistor material of the fourth and fifth aspects of the invention, the additive is discontinuously dispersed in the matrix along with the second phase materials to thereby lower the resistance value of the thermistor material, while controlling the rate of temperature-dependent resistance change of the material. Where the combination of the matrix and/or the second phase materials and the additive constituting the thermistor material is optimized, the mechanical properties of the material can be improved. The resistance value of the electric conductive paths of the second phase materials which are discontinuously dispersed in the matrix without being kept in contact with each other to give a percolation structure greatly depends on the distance between the second phase materials and on the resistance of the insulating phase existing between the materials. Therefore, by discontinuously dispersing the additive in the matrix along with the second phase materials, or that is, by dispersing the additive between the second phase materials or around them, the electric resistance of the electric conductive paths to be formed by the second phase materials is reduced whereby the resistance value of the thermistor material itself is also greatly reduced. As has been mentioned hereinabove, the rate of temperature-dependent resistance change of the thermistor material greatly depends on that in the second phase materials constituting the material. The discontinuous dispersion of the additive in the matrix produces great decrease in the resistance value of the composite material at high temperatures of 500° C. or higher, as compared with the resistance value thereof at room temperature. As a result, therefore, the additive, if discontinuously dispersed in the matrix, makes the composite material have a great rate of temperature-dependent resistance change. By changing the type, the grain size and the amount of the additive to be added, it is possible to control the temperature-dependent resistance value of the composite material.

Regarding the dispersion condition of the second phase materials and the additive, the second phase materials may be contacted with the additive so far as the additive itself is discontinuously dispersed in the matrix. In the discontinuous dispersion of the additive in the matrix, the additive may be continuously dispersed only locally.

One preferred embodiment of the thermistor material of the fourth and fifth aspects of the invention comprises a boride, with which the strength of the material is improved. Though not clear, the reason may be considered because (1) the boride is partly decomposed, during the step of sintering the material, to give an oxide while releasing boron (this may act as a sintering aid for silicon carbide), and the thus-formed boron will promote the sintering of the silicon carbide grains, which are the second phase materials, by any activity, or (2) the oxide formed in the outermost surface of the boride increases the bonding of the boride to the matrix and/or the second phase materials, resulting in that the soundness of the sintered body is enhanced as a whole.

The resistance stabilizer used in the sixth aspect of the invention is effective in improving the reproducibility of the temperature-electric resistance characteristics of the thermistor material in temperature range of from room temperature to 1200° C., especially in greatly improving the stability of the electric resistance of the material in high temperature range of 800° C. or higher. The reason is related to the fact that the titanium oxide used as the stabilizer has a suitable resistance value and is thermally stable at elevated temperature. In addition, it is presumed that the stabilizer will improve the ohmic contact between the outer leads and the electric conductive paths of the second phase materials in the thermistor material.

According to the method of the seventh and eighth aspects of the invention, produced is the thermistor material in which the second phase materials and the additives are discontinuously dispersed in the thermistor matrix to surround each matrix unit (aggregate) as formed through aggregation of a plurality of crystalline matrix grains. In this method, even a small amount of the second phase materials can form good electric conductive paths, and the thermistor material produced has temperature-resistance characteristics that are stable and linear in wide temperature range, and has high mechanical strength.

BEST MODES OF CARRYING OUT THE INVENTION

Figure 1:
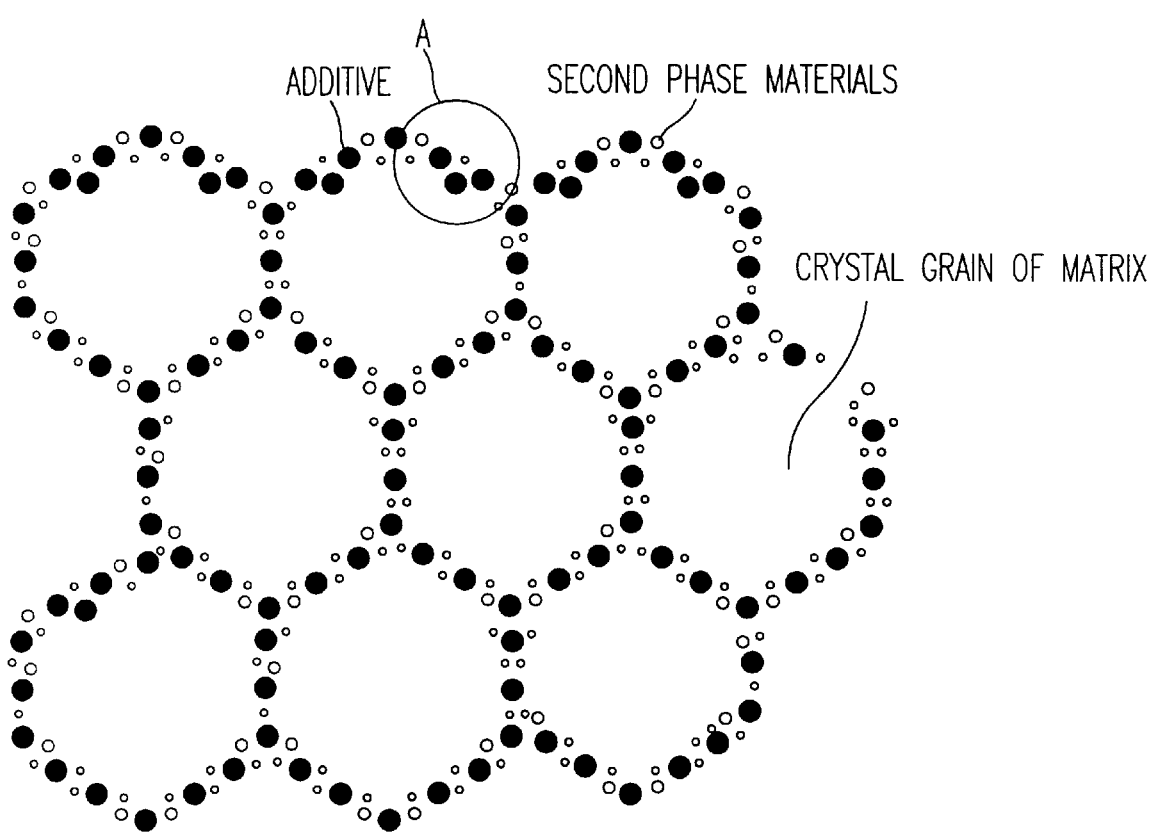
FIG. 1 shows one preferred embodiment of the thermistor material of the invention, illustrating an embodiment of the dispersion of the constituent additive and second phase materials in the matrix.

The matrix constituting the thermistor material of the invention preferably comprises one or more insulating ceramics selected from single oxides, composite oxides, nitrides and their solid solutions. The thermistor material comprising the preferred matrix, in which the distance between the second phase materials existing therein is well controlled, expresses linear temperature-resistance characteristics, with well controlling its rate of temperature-dependent resistance change. Concretely, the matrix includes, for example, mullite, silica, sialon, silicon nitride, alumina, zircon, zirconia, cordierite, boron nitride, aluminium nitride, chromium oxide, titanium oxide, boron oxide, molybdenum oxide, hafnium oxide, yttrialite, yttrium oxide, niobium oxide, tungsten oxide, lanthanum oxide, magnesia, steatite, forsterite, sillimanite, spinel, aluminium titanate, aluminium zirconate, titanium oxide, cordierite, europium oxide, dysprosium oxide, chromium oxide, and rhenium oxide.

Preferably, the second phase materials constituting the thermistor material of the invention are dispersed to surround each matrix unit (aggregate) formed through aggregation of a plurality of crystalline matrix grains.

In this preferred embodiment, a small amount of the second phase materials may be added to the matrix to form electric conductive paths.

Also preferably, the matrix units (aggregates) constituting the thermistor material of the invention have a size of from 1 μm to 500 μm. In this preferred embodiment, a small amount of the second phase materials may be added to the matrix to form uniform electric conductive paths, thereby advantageously making the thermistor material have stable temperature-resistance characteristics. In addition, this embodiment is further advantageous in that the matrix units constituting the composite material are sound (that is, the matrix units have a low degree of porosity), and that the mechanical strength of the thermistor material is improved. Moreover, the oxidation resistance and the heat resistance of the thermistor material of that embodiment are improved.

The size of each matrix aggregate is preferably from 1 μm to 500 μm. If the size is smaller than 1 μm, the matrix aggregates will lose their advantages. If larger than 500 μm, however, the second phase materials will be difficult to discontinuously disperse in the matrix, often resulting in that the resistance value of the composite material will fluctuate too much. More preferably, the size of the matrix aggregate is from 3 μm to 200 μm, even more preferably from 5 μm to 100 μm.

The matrix constituting the thermistor material of the invention preferably comprises one or more insulating ceramics selected from oxides, nitrides, composites and their solid solutions of elements of Group Ia to Group VIII and Group Ib to Group Vb. The second phase materials are discontinuously dispersed in the matrix of that type, while controlling the distance between the second phase materials in the resulting composite material and/or the internal stress of the material, whereby the composite material shall have the intended electric resistance and express linear temperature-resistance characteristics, and in addition, the rate of temperature-dependent resistance change of the material is well controlled.

Even more preferably, the matrix constituting the thermistor material of the invention is an insulating ceramic oxide or ceramic nitride with heat resistance which does not react with the second phase materials and the additives and does not form any solid solution with those. Also preferred are structural ceramics with good heat resistance and high mechanical strength.

The thermistor material of that preferred embodiment is characterized in that its matrix comprises one or more ceramics selected from nitrides, oxides and their composites of elements of Group Ia to Group VIa, Group Ia to Group VIII and Group IIIb to Group Vb; sialon, spinel, mullite and their solid solutions; and cordierite; and that the size of the second phase materials constituting the material is from 1/100 to ½ of that of the starting powder of the matrix. Accordingly, as has been mentioned hereinabove, this thermistor material of the preferred embodiment is advantageous in that the second phase materials surround the plural crystal grains of the matrix to form a network structure.

Where the composite material having that preferred constitution is sintered in a sintering pattern optionally combined with heat treatment, in which the crystalline matrix grains in the sintered body can grow into larger grains, the second phase materials can form the network structure more easily.

Preferably, the second phase materials constituting the wide-range thermistor material of the invention are of one or more semiconductive or conductive substances.

Concretely, the substances include, α-SiC, β-SiC, and SiC doped with a P-type element such as Al or B; fluorite-structured, spinel-structured, NiO—structured, perovskite-structured, corundum-structured, rutile-structured, ZnO-structured, $CaWO_4$-structured, $\alpha$-$A_2O_3$-structured, NaCl-structured and $Cu_2O$-structured oxides of elements of Group Ia to Group VIIa; and also composite oxides such as $CoAl_2O_4$, $NiAl_2O_4$, $ZnFe_2O_4$, $NiFe_2O_4$, $MgAl_2O_4$, $MgFe_2O_4$, $MgCr_2O_4$, $BaTiO_3$, $SrTiO_3$, $LaCrO_3$, and $PbCrO_3$. Also employable are $Cr_2O_3$, $ZrO_2$, $ReO_3$, $La_2O_3$, $LaTiO_3$, $CaMnO_3$, $LaMnO_3$, $CaCrO_3$, $NiFeO_3$, $SrCrO_3$, $Ca_2O$, ZnO, CaO, MnO, NiO, $NiO_2$, CuO and other semiconductor compounds.

Preferred are oxides of transition metals such as Ti, V, Mn, Fe, Ni, Zn, Nb and Mo. Also preferred are α-SiC, β-SiC, and SiC doped with a P-type element such as Al or B.

The second phase materials to be in the thermistor material of the invention are preferably of one or more semiconductive or conductive ceramics selected from carbides, silicides, nitrides, borides, sulfides and oxides. Those materials can form good electric conductive paths with high heat resistance in the thermistor material, and therefore the thermistor material comprising those materials has high reliability in wide temperature range of from room temperature (or even below room temperature) to high temperatures of about 1400° C. or so.

More preferably, the second phase materials constituting the thermistor material of that preferred embodiment are dispersed to give network, layered and/or linear structures. The second phase materials of that type can easily form good current-carrying paths in the material.

Even more preferably, the distance between the second phase materials constituting the thermistor material is between 0.5 nm and 1000 nm. The thermistor material comprising those second phase grains is advantageous in that it has good conductivity with a predetermined resistance value and that its temperature-resistance characteristics produce a linear and preferred rate of temperature-dependent resistance change. In that embodiment, as the case may be, the second phase materials may be partly contacted with each other to form a partially chained structure.

Preferably, the second phase materials constituting the thermistor material form, in the matrix, current-carrying paths having a specific resistivity at room temperature of from 0.1 Ωcm to $10^6$ cm. This embodiment is advantageous in that the distance between the second phase materials existing in the material and/or the internal stress of the material are uniformly changed with the increase in the ambient temperature, whereby the material may have linear temperature-resistance characteristics in wide temperature range.

Also preferably, the second phase materials constituting the thermistor material are of a substance having higher heat resistance than the matrix and having a degree of thermal expansion which is different from that of the matrix. Above all, especially preferred are semiconductors and conductors with n-type or p-type temperature-resistance characteristics, having a high rate of temperature-dependent resistance change of 100 times or more, more preferably 200 times or more. Also preferably, the second phase materials are of a stable substance with high heat resistance that hardly reacts with the second phase and the additive.

Concretely, the second phase materials are preferably of one or more of α-SiC, β-SiC, and α-SiC and β-SiC as doped with a P-type element, or of a mixed phase of those. SiC constituting the second phase materials has a large rate of temperature-dependent resistance change. The P-type element to be doped into SiC is preferably an element of Group IIIa, such as Al, B, In or Ga, more preferably B or Al. A semiconductor compound may also be doped into the materials.

Depending on the difference in thermal expansion between the matrix and the second phase materials, internal stress (residual stress) may be applied to the composite material to thereby make the material have a high rate of temperature-dependent resistance change.

Preferably, the second phase materials constituting the thermistor material of the invention are discontinuously dispersed in the matrix to form a three-dimensional network structure. The discontinuous dispersion as referred to herein means that the materials are not in contact with each other (but may be partly in contact with each other to form partial chains) and exist in the material via the matrix and/or the grain boundary phase or the third phase between the adjacent grains. Having that constitution, the resistance of the composite material can be controlled by both the electric resistance characteristics of the second phase materials themselves and the resistance that depends on the distance between the materials, resulting in that the material can express its own intrinsic electric resistance derived from the combination of the both two. The additive that may be added to the wide-range thermistor material of the invention may be one or more of nitrides, borides, silicides, sulfides, oxides, carbides and their solid solutions of elements of Group IVa to Group VIa and Group IIb to Group Vb, and this may be discontinuously dispersed in the matrix along with the second phase materials. As the case may be, the additive may be partly continuously dispersed therein. Preferably, the additive is stable and has no reactivity with the matrix and the second phase materials, and its electric resistance is lower than the electric resistance of the second phase materials. Where the composite material comprises an additional third phase, it is desirable that the additive is also stable and has no reactivity with the third phase. The additive may form in-situ some electroconductive oxides.

The temperature-resistance characteristics of the additive may be any of p-type and n-type ones. Preferably, the grain size of the additive grains is smaller than that of the crystal grains of the matrix, but may be larger than the latter. Also preferably, the melting point of the additive is higher than that of the third phase.

Preferably, the additive is any of borides, carbides, sulfides, silicides, nitrides and/or oxides of Zr, Ti, Hf, V, Nb, Ta, Cr, Mo and W. More preferred are borides, silicides, carbides and nitrides of those elements.

Figure 2:
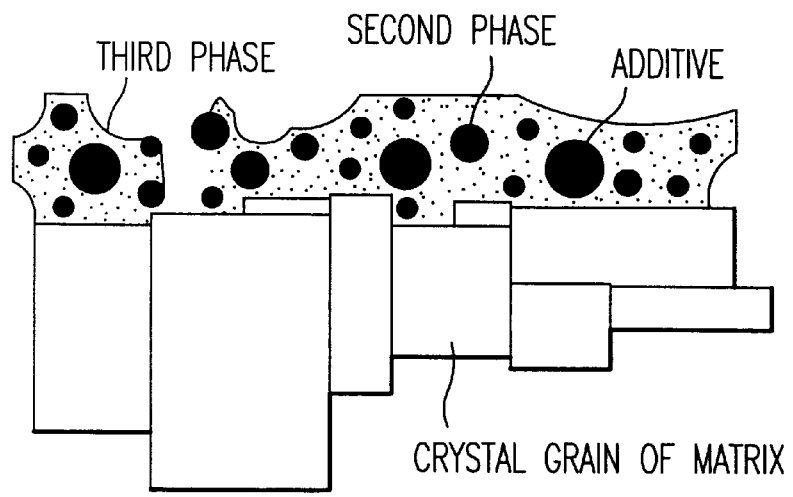
FIG. 2 is an explanatory view illustrating the details of the part A in FIG. 1, while showing the preferred embodiment of the thermistor material of the invention.

Preferably, the additive grains exist between or around the second phase grains to be in mixture with the crystalline matrix grains in the composite material, while being dispersed in the material to form current-carrying paths along with the second phase materials, as in FIG. 1 and FIG. 2. In that constitution, the second phase materials and the additive grains that are adjacent to each other may be or may not be in direct contact with each other.

Figure 3:
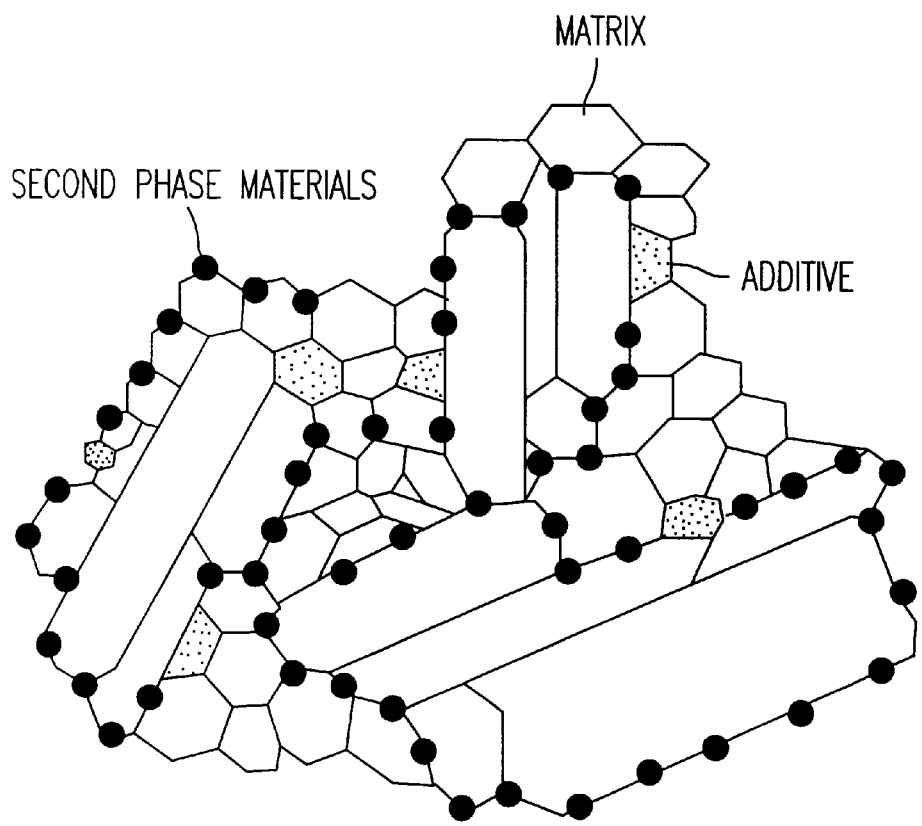
FIG. 3 shows another preferred embodiment of the thermistor material of the invention, illustrating an embodiment of the dispersion of the constituent additive and second phase grains in the matrix.

The position where the additive grains are dispersed is preferably in the grain boundary of the crystalline matrix grains, as in FIG. 3. More preferably, the additive grains are dispersed to surround a plurality of the crystalline matrix grains in the composite material, which, however, is not limitative.

Preferably, the wide-range thermistor material of the invention comprises the mixed phase composed of the second phase materials and the additive grains, in which the mixed phase is dispersed in the matrix to give network, layered and/or linear structures.

Where the second phase materials are dispersed in the matrix to give network, layered and/or linear structures, as in the above, to thereby make some parts of the composite material have a high concentration of the dispersed grains, it is easy to form good current-carrying paths even though small amounts of the second phase materials and the additive are added to the matrix.

The wide-range thermistor material of this preferred embodiment of the invention is characterized in that the second phase materials and the additive are discontinuously dispersed in the matrix to surround the matrix units (aggregates) comprising a plurality of the aggregated crystal grains of the matrix.

That embodiment where the second phase materials and the additive are dispersed in the controlled manner to surround the matrix aggregates comprising such a plurality of the aggregated matrix crystals is advantageous in that even small amounts of the second phase materials and the additive added to the matrix can form good current-carrying paths in the composite material. In addition, the composite material of that embodiment is more sound while having a low degree of porosity, and its mechanical strength is high.

Preferably, the thermistor material of the invention has a rate of temperature-dependent resistance change, $R_{25}/R_{1050}$ (25° C./1050° C.), of from 10 to $10^4$ If the rate is small, or that is, smaller than 10, the resistance change in the thermistor material that depends on the ambient temperature change is so small that the thermistor material could not be applied to accurate temperature detection. If, however, the rate is large, or that is, larger than $10^4$, the resistance at room temperature of the thermistor of the composite material will be too large, or the resistance at high temperatures thereof will be too small, thereby resulting in that the measurement of the voltage of the thermistor is difficult or the thermistor itself will generate too much heat. If so, in addition, the wide-range temperature detection with the thermistor will be difficult. Preferably, the resistance of the thermistor device comprising the composite material falls between 100 Ω and 100 kΩ.

The thermistor material of the preferred embodiment is characterized in that its matrix comprises one or more ceramics selected from nitrides, oxides, and their composites and solid solutions of one or more of Al, B, Ca, La, Mg, Si, Y, Yb, Ti and Zr, and that the grain size of the second phase materials is from 1/100 to ½ of that of the matrix grains. The thermistor material of this preferred embodiment is advantageous in that even a smaller amount of the second phase materials added to the matrix easily give good electric conductive paths as uniformly dispersed at regular intervals.

Preferably, the thermistor material of the invention comprises the first phase of the matrix comprising an electrically-insulating substance, and the second phase of the grains of a semiconductive or conductive substance that are dispersed in the matrix to discontinuously surround the matrix grains of the first phase, in which those first phase grains and second phase grains form cells of the minimum constituent units of the composite material in such a manner that the second phase materials are discontinuously dispersed in the material to give a three-dimensional network structure, and in which the second phase materials are of a substance having a large rate of temperature-dependent resistance change.

Also preferably, the thermistor material of the invention comprises the first phase of the matrix comprising an electrically-insulating substance, the second phase of the grains of a semiconductive or conductive substance that are dispersed in the matrix to discontinuously surround the matrix grains of the first phase, and the additive as dispersed in the matrix also to discontinuously surround the matrix grains of the first phase along with the second phase materials, in which those first phase grains and second phase materials and the additive form cells of the minimum constituent units of the composite material in such a manner that the second phase grains and the additive are discontinuously dispersed in the material to give a three-dimensional network structure, and in which the second phase materials are of a substance having a large rate of temperature-dependent resistance change.

More preferably, in the wide-range thermistor material of those embodiments, the semiconductive or conductive, second phase materials are discontinuously dispersed in the electrically-insulating matrix to give a percolation structure in which the grains are not in contact with each other, and one or more additives, which are selected from nitrides, borides, silicides, sulfides and carbonates of elements of Group IVa to Group VIa and Group IIb to Group Vb, and of which the electric resistance value is lower than that of the second phase materials, are also discontinuously dispersed in the matrix.

Even more preferably, the thermistor material further comprises an additional third phase, of which the modulus of elasticity is lower than that of the matrix and that of the second phase materials, in such a manner that the third phase is continuously dispersed in the matrix to be at least in contact with any of the interface between and around the second phase materials and the interface between the matrix and the second phase materials. This third phase acts to relax any excessive internal stress of the composite material that is derived from the difference in thermal expansion between the matrix and the second phase materials, and this is effective in making the composite material have high instant breaking strength and in improving the shock resistance of the material and the durability thereof to thereby make the material have good thermal fatigue-resistant characteristics and mechanical fatigue-resistant characteristics. By varying the composition and also the thickness (amount) of the third phase between the second phase materials, it is possible to control the electric resistance value between the second phase materials.

Also preferably, the thermistor material comprises an additional third phase, of which the modulus of elasticity is same as or lower than that of the matrix and that of the second phase materials, in such a manner that the third phase is continuously dispersed in the matrix to be at least in contact with any of the interfaces between the matrix grains, between the matrix and the second phase materials and even between and around the second phase materials, while the additive is discontinuously dispersed in the third phase.

This third phase acts to relax any excessive internal stress of the composite material that is derived from the difference in thermal expansion between the matrix and the second phase materials, or that is, this functions as a buffer phase, with the result that the temperature-resistance characteristics of the composite material is stabilized with no hysteresis.

Where the composition of the third phase is so selected that it may be a phase of bonding the matrix and the second phase materials via it, the thus-selected third phase is effective in controlling the dispersion of the second phase materials to thereby improve the durability of the material with increasing its instant breaking strength, shock resistance, thermal fatigue-resistant characteristic and mechanical fatigue-resistant characteristic.

Preferably, the thickness (width) of the third phase is from 1 nm to 100 $\mu$m. If the thickness of the third phase is smaller than 1 nm, the effect of the third phase to relax the internal stress of the composite material is small, resulting in that the discontinuously-dispersed second phase materials could not satisfactorily exhibit their effect. On the other hand, however, if the thickness of the third phase is larger than 100 $\mu$m, the electric resistance value of the composite material is too high, resulting in that the material could not have linear temperature-resistance characteristics. More preferably, the thickness (width) of the third phase is from 1 nm to 1 $\mu$m. Comprising the third phase falling within the more preferred range, the composite material shall have better temperature-resistance characteristics and higher mechanical strength.

The thermistor material of that preferred embodiment of the invention is characterized in that the mixed phase composed of the second phase materials, the additive and the third phase is dispersed in the matrix to give network, layered and/or linear structures. Comprising the mixed phase of that type, the composite material is advantageous in that those second phase materials, additive and third phase substance constituting it form good electric conductive paths in the material even though their amounts added are small, and that the composite material keeps good linear resistance temperature characteristics in wide temperature range.

The thermistor material of that preferred embodiment is further characterized in that the second phase materials, the additive and the third phase are continuously dispersed in the matrix to surround the matrix units (aggregates) composed of a plurality of the aggregated crystal grains of the matrix. Accordingly, even though their amounts added to the matrix are small, those second phase grains, additive and third phase form good current-carrying paths in the matrix, whereby the composite material comprising them shall have stable and linear resistance temperature characteristics in wide temperature range. Moreover, the composite material shall have high mechanical strength.

The wide-range thermistor material of the invention may be sintered through heat treatment in a hot atmosphere at from 600° C. to 1500° C., whereby any larger and/or uneven internal stress of the resulting, sintered body, which is to be caused by the difference in thermal expansion between the constituent components, can be relaxed, and in addition, the variation in the resistance value of the sintered body, which is to be caused by the change in the structure of the third phase to occur in the first heating stage, can be evaded. As a result, the sintered body of the material can have stable resistance temperature characteristics with no hysteresis. The atmosphere for the heat treatment is preferably one suitable for the sintering of the matrix and the second phase materials constituting the composite material to be sintered. For example, when the matrix is of $Si_3N_4$ and the second phase materials are of SiC, preferably employed is a nitrogen gas atmosphere. The temperature for the heat treatment is preferably higher than the highest temperature of the intended temperature detection range.

On the other hand, when the matrix material is a non-oxide such as $Si_3N_4$ or sialon, the composite material may be heat-treated in air at a temperature of about 1400° C. or so to thereby form an oxide layer on the surface of the sintered body. Being covered with the oxide layer, the sintered body can have improved oxidation resistance.

In the method of producing the thermistor material of the invention, it is preferable that an insulating material powder for a third phase, of which the modulus of elasticity is the same as or lower than that of the matrix material, is added to the matrix along with the second phase material powder.

In the method, it is also preferable to add the insulating starting powder for the third phase, of which the modulus of elasticity is the same as or lower than that of the matrix material, to the matrix along with the second phase starting powder and the additive.

In the method, the semiconductive or conductive starting powder for the second phase may be mixed with an additive material comprising one or more oxides of elements of Group IVa, Group Va and Group VIa, and boron and carbon or boron carbide, prior to being mixed with the matrix material.

Regarding the additive, any of metals of Group IVa to Group VIa and their oxides may be used to form in-situ fine grains of nitrides, borides, silicides, oxides and carbides of those metals of Group IVa to Group VIa, and the grains thus formed in-situ may be dispersed in the matrix.

As the case may be, the matrix material may be mixed with Si and/or $SiO_2$ and carbon, and pre-sintered to form SiC in-situ, and thereafter the additive may be added to the thus pre-sintered powder, then shaped and sintered to give the composite material of the invention.

In the method of the invention, the wide-range thermistor material of the invention is sintered through heat treatment in a hot atmosphere at from 600° C. to 1500° C., whereby any larger and/or uneven internal stress of the resulting, sintered body, which is to be caused by the difference in thermal expansion between the constituent components, can be relaxed. As a result, the sintered body of the material can have stable temperature-resistance characteristics with no hysteresis. The atmosphere for the heat treatment is preferably one suitable for the sintering of the matrix and the second phase grains constituting the composite material to be sintered. For example, when the matrix is of $Si_3N_4$ and the second phase grains are of SiC, preferably employed is a nitrogen gas atmosphere.

EXAMPLE 1

First, 6% by weight of $Y_2O_3$ powder was added to 94% by weight of $Si_3N_4$ powder (specific surface area: 12 m²/g, thermal expansion coefficient: 3.0×10⁻⁶/° C.), mixed in a ball mill along with ethanol, and then spray-dried to prepare a granular powder having a particle size of from 40 to 50 μm.

On the other hand, α-SiC (rate of temperature-dependent resistance change: about $10^6$ times, particle size: 0.4 μm) and $Y_2O_3$ powder were mixed in a ratio by weight of 5/1 to prepare a mixed powder.

Next, 10% by weight, relative to the total weight of the resulting mixture, of the mixed powder was added to the granular powder, and dry-mixed to prepare a powdery mixture.

The thus-prepared powdery mixture was put into a die, shaped in an uniaxial pressing manner (pressure: 20 MPa), and then hot-pressed at 1850° C. for 1 hour (in $N_2$) under a pressure of 20 MPa to obtain a thermistor material of the invention (Sample No. 1).

The cross section of the sample was etched with ECR plasma, and its surface was observed with SEM (scanning electromicroscope). As a result, it was confirmed that the sample of the thermistor material of the invention prepared herein had a three-dimensional cell wall network structure of SiC particles, in which the SiC particles surrounded each unit cell composed of a plurality of $Si_3N_4$ (matrix) crystal grains, in which the SiC particles were dispersed in the composite material at predetermined intervals without being in contact with each other, and in which a large number of those unit cells of the matrix existed in the composite material.

EXAMPLE 2

64% by weight of $Si_3N_4$ powder, 6% by weight of $Y_2O_3$ powder and 30% by weight of α-SiC powder (rate of temperature-dependent resistance change: about $10^5$ times, mean primary grain size: 0.3 μm) (particle size ratio of the starting powder, SiC powder/$Si_3N_4$ powder=1/2.0) were put into a mill, and wet-mixed for 24 hours to prepare a powdery mixture.

Next, the thus-prepared powdery mixture was put into a die, shaped in an uniaxial pressing manner (pressure: 20 MPa), and then hot-pressed at 1850° C. for 1 hour (in $N_2$) under a pressure of 20 MPa to obtain a thermistor material of the invention (Sample No. 2).

The cross section of the sample was etched with ECR plasma, and the grain microstructure in its surface was observed with SEM (scanning electromicroscope). As a result, it was confirmed that the sample of the thermistor material of the invention prepared herein had a three-dimensional network structure in which the second phase particles of SiC were discontinuously dispersed in the matrix.

EXAMPLE 3

70% by volume of $Al_2O_3$ powder (specific surface area: 4.8 m²/g) and 30% by volume of α-SiC (mean primary particle size: 0.4 μm, thermal expansion coefficient: 4.3×10⁻⁶/° C.) (particle size ratio of the starting powder, SiC powder/$Al_2O_3$ powder=1/2.5) were mixed in ethanol for 24 hours to prepare a powdery mixture.

Next, the thus-prepared powdery mixture was put into a die, shaped in an uniaxial pressing manner (pressure: 20 MPa), and then hot-pressed at 1850° C. for 1 hour (in Ar) under a pressure of 20 MPa to obtain a thermistor material of the invention (Sample No. 3).

The cross section of the sample was etched, and the grain microstructure in its surface was observed with SEM (scanning electromicroscope). As a result, it was confirmed that the sample of the thermistor material of the invention prepared herein had a three-dimensional network structure in which the second phase particles of SiC were discontinuously dispersed in the matrix.

EXAMPLE 4

70% by volume of $ZrO_2$ powder and 30% by volume of β-SiC (thermal expansion coefficient: 2.3 times of $ZrO_2$) (particle size ratio of the starting powder, SiC powder/$ZrO_2$ powder=1/8) were mixed in ethanol for 24 hours to prepare a powdery mixture.

Next, the thus-prepared powdery mixture was put into a die, shaped in an uniaxial pressing manner (pressure: 20 MPa), and then hot-pressed at 1700° C. for 1 hour (in $N_2$) under a pressure of 20 MPa to obtain a thermistor material of the invention (Sample No. 4).

The cross section of the sample was etched, and the grain structure in its surface was observed with SEM (scanning electromicroscope). As a result, it was confirmed that the sample of the thermistor material of the invention prepared herein had a three-dimensional network structure in which the second phase particles of SiC were discontinuously dispersed in the matrix.

Comparative Example 1

For comparison, the same process as in Example 1 was repeated, except that 84% by weight of $Si_3N_4$ powder (mean primary particle size: 0.2 μm), 6% by weight of $Y_2O_3$ powder (mean primary particle size: 0.5 μm) and 10% by weight of SiC powder (particle size ratio, SiC powder/$Si_3N_4$ powder=1.5/1) were wet-milled in a ball mill to prepare a powdery mixture (granule particle size: 500 μm) in which the SIC particles were uniformly dispersed in the matrix. The sample thus prepared herein through shaping and hot-pressure is referred to as Sample No. C1. The cross section of this comparative sample was observed, which verified that the SiC particles were uniformly dispersed in the matrix $Si_3N_4$.

Comparative Example 2

For comparison, 6% by weight of $Y_2O_3$ powder was added to 74% by weight of $Si_3N_4$ powder (specific surface area: 4.8 $m^2$/g), milled in a ball mill along with ethanol, and then granulated in a granulator to prepare a granular powder having a particle size of from 150 to 500 μm. To this was added 20% by weight of β-SiC powder, and dry-mixed to prepare a comparative powdery mixture.

Next, this comparative powdery mixture was put into a die, shaped in an uniaxial pressing manner (pressure: 20 MPa), and then hot-pressed at 1950° C. for 1 hour (in $N_2$) under a pressure of 20 MPa to obtain a comparative composite material (Sample No. C2).

The cross section of the comparative sample was etched with ECR plasma, and the grain microstructure in its surface was observed with SEM (scanning electromicroscope). As a result, it was confirmed that, in the comparative sample of the composite material prepared herein, β-SiC particles were dispersed to continuously surround plural $Si_3N_4$ crystal grains therein.

Comparative Example 3

For comparison, prepared herein was a sintered sample made of β-SiC (Sample No. C3).

Comparative Examples 4 and 5

For comparison, prepared herein were sintered samples of commercially-available thermistor materials, MnO—CoO—NiO (Sample No. C4) and $ZrO_2$—$Y_2O_3$ (Sample No. C5).

Test for Evaluating Characteristics of Samples:

The thermistor material samples of Examples 1 to 4, and the comparative sintered materials of Comparative Examples 1 to 5 were tested in a four probe method in a temperature range of from room temperature to 1050° C. to measure their electric resistance. The data obtained are shown in FIG. 4 and Table 1.

TABLE 1

| Sample No. | | Specific Resistivity (Ωcm) | | Rate of Temperature-Dependent Resistance Change, $R_{(room\ temperature)}/R_{(1050°\ C.)}$ |
|---|---|---|---|---|
| | | Room Temperature | 1050° C. | |
| Sample of the Invention | 1 | $4.0 \times 10^4$ | 395 | 101 |
| | 2 | $3.9 \times 10^4$ | 389 | 100 |
| | 3 | $3.9 \times 10^5$ | $1.5 \times 10^3$ | 260 |
| | 4 | $3.4 \times 10^6$ | 36 | $9.5 \times 10^4$ |
| Comparative Sample | C1 | $2.0 \times 10^9$ | $1.5 \times 10^7$ | 133 |
| | C2 | 14 | 4 (constant at 400° C. and higher) | 3.5 |
| | C3 | 0.1 | 0.02 (constant at 300° C. and higher) | 5 |
| | C4 | $1.3 \times 10^2$ | 1.5 (little change at 300° C. and higher) | 87 |
| | C5 | $1.2 \times 10^7$ (500° C.) | $9.5 \times 10^2$ | $1.2 \times 10^4$ |

Figure 4:
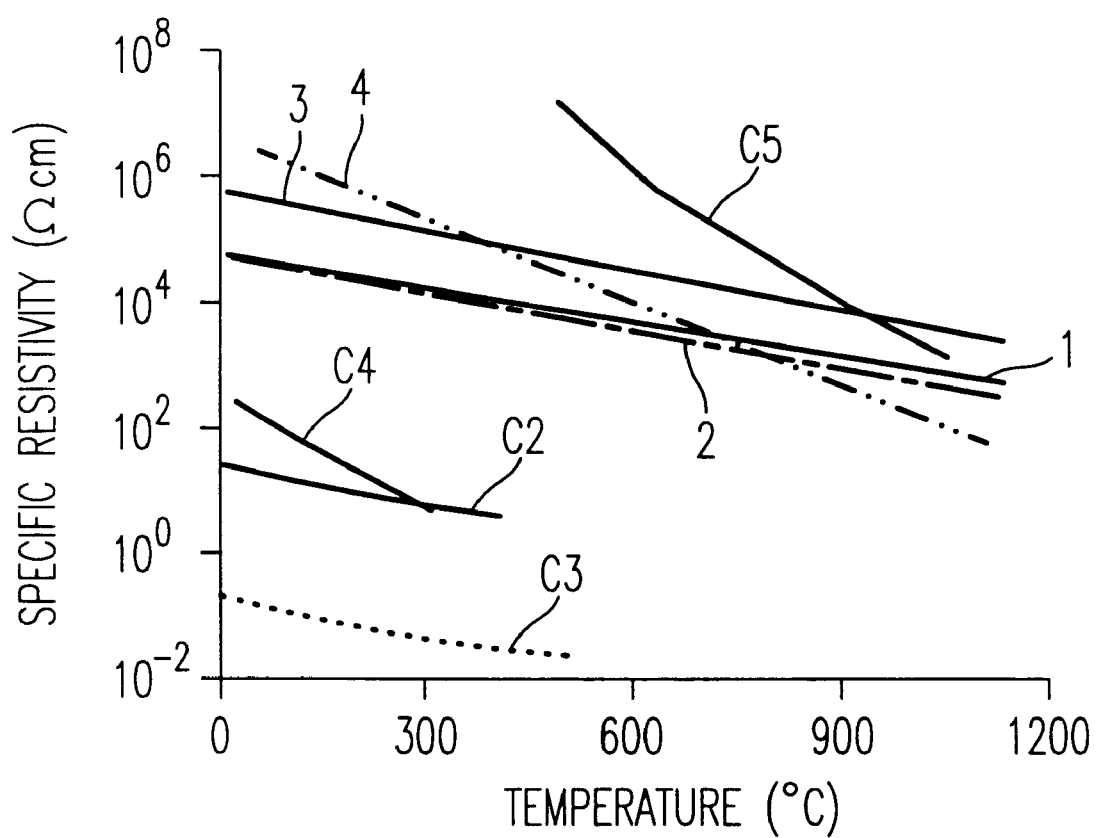
FIG. 4 is a graph showing the temperature-resistance characteristics of the thermistor materials of the invention obtained in Examples 1 to 4, and those of the sintered materials of Comparative Examples 2 to 5.

From the data in FIG. 4 and Table 1, it is known that the resistance temperature characteristics of the sintered samples of Examples 1 to 4 of the invention are all linear in wide temperature range of from room temperature to 1050° C., on the semi-logarithmic graph. In addition, it is further known that the rate of the temperature-dependent resistance change of those samples of the invention is larger than 100. Moreover, it is also known that, by varying the difference in thermal expansion between the matrix and the second phase materials constituting the samples, the resistance value of each sample significantly varies and the rate of temperature-dependent resistance change of each sample also significantly varies. Those data verify that the thermistor material samples of the invention prepared herein all had wide-range linear temperature-resistance characteristics and a great rate of temperature-dependent resistance change varying in wide temperature range.

As opposed to those, the comparative sintered sample (Sample No. C1) in which SiC was uniformly dispersed had a resistance value of larger than $10^7$ Ωcm.

The comparative sintered sample (Sample No. C2) in which β-SiC was continuously dispersed, and the comparative sintered sample (Sample No. C3) which was made of SiC only both had a low resistance value, and their resistance temperature characteristics gave a curved line and were constant at about 400° C. and higher.

The resistance temperature characteristics of the sintered samples of commercially-available $ZrO_2$—$Y_2O_3$ (Sample No. C5) and MnO—CoO—NiO (Sample No. C4) both gave a curved line that greatly descends with the increase in the ambient temperature. The temperature range to which those comparative samples are applicable for accurate temperature detection is narrow, or that is, narrower than ½ of the temperature range to which the samples of the invention are applicable.

EXAMPLE 5

95% by volume of α-SiC (rate of temperature-dependent resistance change: about $6 \times 10^4$ times) and 5% by volume of $ZrB_2$ powder were milled in a ball mill along with ethanol to prepare a mixed powder A having a grain size of 40 μm. On the other hand, 6% by weight of $Y_2O_3$ powder was added to 94% by weight of $Si_3N_4$ powder, milled in a ball mill along with ethanol, and then spray-dried to prepare a granular powder B having a particle size of 80 μm. These were mixed in a ratio by volume of 7/3 (B/A) to prepare a powdery mixture in which the granule B were surrounded with the powder A.

The thus-prepared powdery mixture was put into a die, shaped in an uniaxial pressing manner (pressure: 20 MPa), and then hot-pressed at 1850° C. for 1 hour (in $N_2$) under a pressure of 20 MPa to obtain a thermistor material of the invention (Sample No. 5).

The cross section of the sample was etched with ECR plasma, and its surface was observed with SEM (scanning electromicroscope). As a result, it was confirmed that the sample of the thermistor material of the invention prepared herein had a three-dimensional cell wall network-structure of SiC particles, in which the SiC particles surrounded each unit cell (aggregate) composed of a plurality of $Si_3N_4$ (matrix) crystal grains, and in which the SiC particles were discontinuously dispersed in the matrix at predetermined intervals.

EXAMPLE 6

30% by volume of α-SiC powder (mean primary particle size: 0.4 μm) and 0.6% by volume of $TiB_2$ powder were wet-mixed together with 63.4% by volume of $Si_3N_4$ powder (particle size ratio, SiC powder/$Si_3N_4$ powder=1/2.5) and 6% by volume of $Y_2O_3$ powder in ethanol for 24 hours to prepare a composite powder.

Next, the composite powder was put into a die, shaped in an uniaxial pressing manner, and then hot-pressed at 1850° C. for 1 hour (in $N_2$) under a pressure of 20 MPa to obtain a thermistor material of the invention (Sample No. 6).

The cross section of the sample was etched with ECR plasma, and its surface was observed with SEM (scanning electromicroscope). As a result, it was confirmed that the sample of the thermistor material of the invention prepared herein had a three-dimensional cell wall network-structure of SiC particles, in which the SiC particles surrounded aggregates each composed of a plurality of $Si_3N_4$ (matrix) crystal grains, and in which the SiC particles were discontinuously dispersed in the matrix.

EXAMPLE 7

30% by volume of α-SiC powder (mean primary particle size: 0.4 μm) and 5% by volume of VN powder were wet-mixed for 24 hours to prepare a mixed powder. This was further wet-milled together with 59% by volume of $Si_3N_4$ powder (particle size ratio, SiC powder/$Si_3N_4$ powder=1/2.5) and 6% by volume of $Y_2O_3$ powder in ethanol for 72 hours to prepare a composite powder.

Next, the composite powder was put into a die, shaped in an uniaxial pressing manner, and then hot-pressed at 1850° C. for 1 hour (in $N_2$) under a pressure of 20 MPa to obtain a thermistor material of the invention (Sample No. 7).

EXAMPLE 8

In the same manner as in Example 5 except that the amount of the $ZrB_2$ powder added was reduced to 2.5% by volume, obtained was a thermistor material of the invention (Sample No. 8).

EXAMPLE 9

40% by volume of α-SiC powder (mean primary particle size: 0.4 μm) was milled in ethanol for 196 hours, using sialon balls, and then wet-mixed together with 54% by volume of $Si_3N_4$ powder (particle size ratio, starting (unground) SiC powder/$Si_3N_4$ powder=1/2.5) and 6% by volume of $Y_2O_3$ powder to prepare a composite powder.

Next, the composite powder was put into a die, shaped in an uniaxial pressing manner, and then hot-pressed at 1850° C. for 1 hour (in $N_2$) under a pressure of 20 MPa to obtain a thermistor material of the invention (Sample No. 9).

The cross section of the sample was etched with ECR plasma, and its surface was observed with SEM (scanning electromicroscope). As a result, it was confirmed that the sample of the thermistor material of the invention prepared herein had a three-dimensional cell wall network-structure of fine SiC p articles, in which the SiC particles surrounded aggregates each composed of a plurality of $Si_3N_4$ (matrix) crystal grains, and in which the SiC particles were discontinuously dispersed in the matrix.

Comparative Example 6

For comparison, 64% by weight of Si3N4 powder (mean primary particle size: 0.2 μm), 6% by weight of Y2O3 powder (mean primary particle size: 0.5 μm) and 25% by weight of high-purity β-SiC powder (mean primary grain size: 0.03 μm) were wet-milled all together in a ball mill for 24 hours to prepare a powdery mixture.

Next, the powdery mixture was put into a die, shaped in an uniaxial pressing manner, and then hot-pressed at 1850° C. for 1 hour (in $N_2$) under a pressure of 20 MPa to obtain a comparative, sintered sample (Sample No. C6).

The cross section of this comparative sample was observed, in which it was found that the SiC particles were network-wise dispersed in the matrix, $Si_3N_4$.

Comparative Example 7

For comparison, prepared was a commercially-available, sintered α-SiC (Sample No. C7).
Test for Evaluating Characteristics of Samples:

The thermistor material samples of Examples 5 to 9, and the comparative sintered materials of Comparative Examples 6 and 7 were tested in a four probe method in a temperature range of from room temperature to 1050° C. to measure their electric resistance. The data obtained are shown in Table 2, and FIG. 5.

TABLE 2

| Sample No. | | Specific Resistivity (Ωcm) | | Rate of Temperature-Dependent Resistance Change, $R_{(room\ temperature)}/R_{(1050°\ C.)}$ |
|---|---|---|---|---|
| | | Room Temperature | 1050° C. | |
| Sample of the Invention | 5 | $2.4 \times 10^3$ | 5.9 | 406 |
| | 6 | $1.8 \times 10^4$ | 29 | 607 |
| | 7 | $3.5 \times 10^3$ | 8.6 | 407 |
| | 8 | $2.5 \times 10^3$ | 30 | 850 |
| | 9 | $6.9 \times 10^3$ | 11 | 630 |
| | 10 | $8.7 \times 10^3$ | 78.5 | 110 |
| Comparative Sample | C6 | 150.4 | 37.4 | 4.0 |
| | C7 | $2.0 \times 10^4$ | 70 (450° C.) | 285 |

Figure 5:
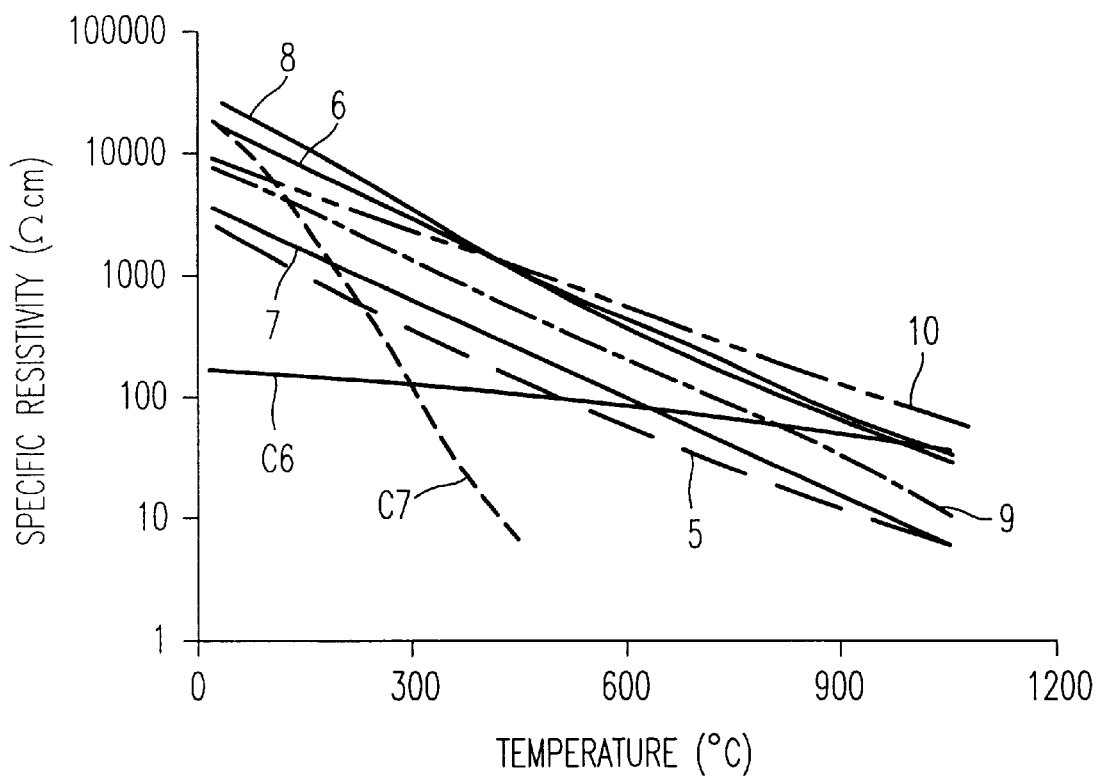
FIG. 5 is a graph showing the temperature-resistance characteristics of the thermistor materials of the invention obtained in Examples 5 to 10, and those of the sintered materials of Comparative Examples 6 and 7.

From the data in FIG. 5 and Table 2, it is known that the resistance temperature characteristics of the sintered samples of Examples 5 to 9 of the invention are all linear in the wide temperature range of from room temperature to 1050° C., on the semi-logarithmic graph, that the temperature-dependent decrease in the resistance value of those samples of the invention is much greater than that of the comparative sample (C6) to which no additive was added, and that the rate of temperature-dependent resistance change of the samples of the invention is much larger than that of the comparative samples. It is further known that, by varying the amounts of the additives added the samples of the invention, the rate of temperature-dependent resistance change of those samples greatly varies.

The comparative sintered sample (Sample No. C6), in which β-SiC having a small resistance value and a small rate of temperature-dependent resistance change was dispersed in $Si_3N_4$ having a small rate of temperature-dependent resistance change to give a three-dimensional network structure, had a small resistance value. Although the resistance of this sample (C6) decreased linearly with the increase in the ambient temperature, its rate of temperature-dependent resistance change was only about 4 times.

The temperature-resistance characteristics of the sintered β-SiC sample were exponential and became constant at 400° C. and higher, and the temperature range to which the sample is applicable for accurate temperature detection was narrow to fall between room temperature and about 400° C. or so.

As is noted from the above, those comparative sintered samples are problematic in that their rate of temperature-dependent resistance change is low and that the temperature range to which they are applicable for temperature detection is narrow. It is known that the comparative samples are not applicable to wide-range thermistor materials.

EXAMPLE 10

$Si_3N_4$ powder (particle size: 1 μm) was wet-mixed together with 6% by volume of $Y_2O_3$ powder (particle size: about 0.4 μmm), 30% by volume of α-SiC powder (particle size: 0.3 μm) and 3% by volume of $TiO_2$ powder in a ball mill for 24 hours. The resulting mixture was shaped into circular discs (φ60×10 mm), using a uniaxial die pressing machine, and these discs were hot-pressed at 1850° C. (in $N_2$) under a pressure of 20 MPa for 1 hour. The thus-sintered discs were machined into test pieces (2×20 mm).

Comparative Example 8

For comparison, $Si_3N_4$ powder (particle size: 1 μm) was wet-mixed together with 6% by volume of $Y_2O_3$ powder (particle size: about 0.4 μm) and 30% by volume of α-SiC powder (particle size: 0.3 μm) in a ball mill for 24 hours. The resulting mixture was shaped into circular discs (φ60×10 mm), using a uniaxial die pressing machine, and these discs were hot-pressed at 1850° C. (in $N_2$) under a pressure of 20 MPa for 1 hour. The thus-sintered discs were machined into test pieces (2×20 mm).

Figure 6:
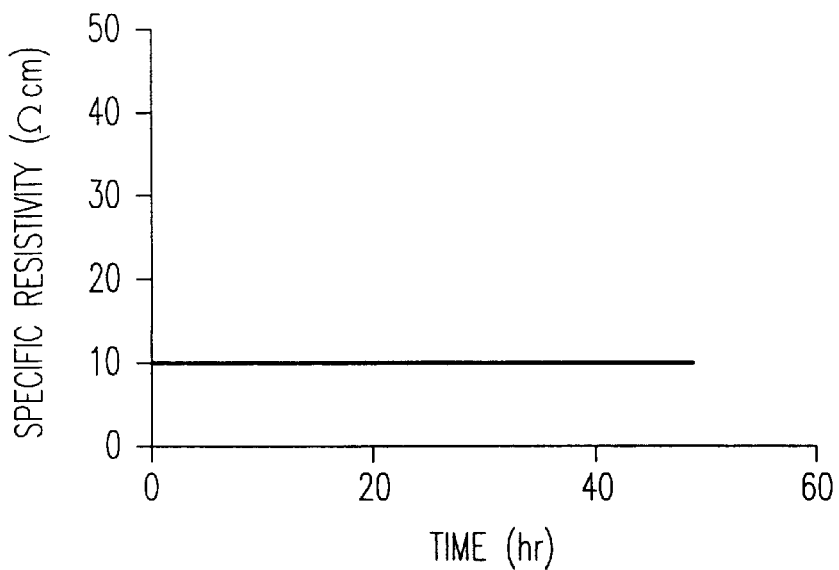
FIG. 6 is a graph showing the electric resistance stability at 1000° C. of the thermistor material of the invention obtained in Example 10.

Test for Evaluating Characteristics of Samples:

These samples were kept at 1000° C. (in Ar) for 50 to 60 hours, whereupon the time-dependent resistance change in those samples was measured in a four probe method. As a result, it was found that the time-dependent resistance change in the comparative sample was extremely large to be +/−72%, while that in the sample of the invention was extremely small to be +/−0.3%. Those data verify the high reliability of the sample of the invention (see FIG. 6).

INDUSTRIAL APPLICABILITY

As has been mentioned hereinabove, the thermistor material of the invention has many applications in various fields including electric and electronic appliances for household and industrial use, those for physical and chemical studies, those for medical and surgical use, those for communication use, and those for space development, for example, in temperature sensors for cooking utensils such as microwave ovens and electric rice cookers; temperature sensors for air-conditioners and heaters such as fan heaters; temperature sensors for tools for health and sanitation, such as electronic thermometers and toilet seats equipped with warm water supply for washing the private parts; temperature sensors for other house hold electric appliances, such as refrigerators and clocks; temperature sensors for various OA appliances; temperature sensors for cars for manifold temperature detection, engine temperature detection and cooling water temperature detection; temperature sensors in industrial use for tobacco leaves driers, ice makers, sea temperature detectors, vending machines and freezing showcases; and temperature sensors for other various detectors. In addition to those, one special application of the thermistor material is for hot thermistors, for example, in humidity sensors and anemometer sensors. Moreover, the thermistor material is usable in various detector elements, for example, in temperature controllers; temperature measuring devices such as temperature recorders; absolute hygrometers equipped with absolute humidity sensors in which the thermistor material is used in humidity detector elements; and other humidity measuring devices for dew-point hygrometers, dew condensation inhibitors, humidity controllers and water activity detectors. Further, the thermistor material is applicable to the measurement of gas speed, fluid speed, vacuum degree and gas concentration, and can be used in composite appliances with different applications of those mentioned above.

In addition, the thermistor material of the invention is usable in wide-range thermistors for controlled exhaust gas detection appliances that are applicable to wide temperature range of from 100° C. to 1000° C. Where the thermistor material comprises non-oxide substances as the matrix and the second phase materials, its resistance value does not change for a long period of time even in a reducing atmosphere such as exhaust gas from cars, even when it is not protected with any protectors. Using the thermistor material of the invention, therefore, it is possible to provide good wide-range thermistors with high responsibility.

What is claimed is:

1. A wide-range thermistor material comprising:
   a rate of temperature-dependent resistance change of 10 to $10^4$;
   a matrix formed of an electrically-insulating ceramic; and
   second phase materials discontinuously dispersed in said matrix, and formed of a semiconductive or conductive substance having a large rate of temperature-dependent resistance change.

2. The wide-range thermistor material as claimed in claim 1, further comprising third phase materials having a lower modulus of elasticity than said matrix and said second phase materials;
   wherein said third phase materials are continuously dispersed and connected to at least any interface between said second phase materials and/or between said matrix and said second phase materials.

3. The wide-range thermistor material as claimed in claim 1, further comprising one or more additive selected from the group consisting of nitrides, borides, silicides, sulfides, oxides and carbides of elements of Group IVa to Group VIa and Group IIb to Group Vb;
   wherein said additive is discontinuously dispersed in said matrix along with said second phase materials to form a mixed phase of said additive and said second phase materials.

4. The wide-range thermistor material as claimed in claim 3, wherein said second phase materials and said additive are discontinuously dispersed in said third phase to form a mixed phase of said second phase material, said additive, and said third phase materials.

5. A wide-range thermistor material comprising:
a range of temperature-dependant resistance change of 10 to $10^4$; and
a matrix formed of an electrically-insulating ceramic; and
second phase materials discontinuously dispersed in said matrix, and formed of a semiconductive or conductive substance having a rate of temperature-dependant resistance change of 100 times or more.

6. The wide-range thermistor material as claimed in claim 5, in which said second phase materials have network, layered and/or linear structures.

7. The wide-range thermistor material as claimed in claim 5, in which the matrix is an aggregate as formed through aggregation of a plurality of crystal grains of the matrix, and said second phase materials surround the matrix aggregate.

8. The wide-range thermistor material as claimed in claim 5, in which said second phase materials form electric conductive paths having a specific resistivity of from 0.1 Ωcm to $10^6$ Ωcm at room temperature in said matrix.

9. The wide-range thermistor material as claimed in claim 5, in which a difference in thermal expansion coefficient between said matrix and said second phase materials falls between 1.01 and 10 times.

10. The wide-range thermistor material as claimed in claim 5, in which a distance between said second phase materials falls between 0.5 nm and 1000 nm.

11. The wide-range thermistor material as claimed in claim 5, in which the matrix aggregate has a particle size between 1 μm and 500 μm.

12. The wide-range thermistor material as claimed in claim 5, in which said matrix is of one or more ceramics selected from nitrides, oxides and their composites of one or more of Al, B, Ca, Mg, Si, Y, Yb, Ti and Zr, and sialon, spinel, mullite and cordierite, and said second phase materials have a particle size of from 1/100 to 1/2 of that of said matrix.

13. The wide-range thermistor material as claimed in claim 5, in which said second phase materials are of at least one of α-SiC, β-SiC, α-SiC doped with a P-type element, β-SiC doped with a P-type element, semiconductive compounds and their composites.

14. The wide-range thermistor material as claimed in claim 5, which further comprises third phase materials having a lower modulus of elasticity than said matrix and said second phase materials, and dispersed to be continuously in connection to at least any interface between said second phase materials and/or between said matrix and said second phase materials.

15. The wide-range thermistor material as claimed in claim 14, in which said third phase has a thickness of from 1 nm to 10 μm.

16. The wide-range thermistor material as claimed in claim 14, in which said second phase materials and one or more additives of nitrides, borides, silicides, sulfides, oxides and carbides of elements of Group IVa to Group VIa and Group IIb to Group Vb are discontinuously dispersed in said third phase to form a mixed phase of said second phase materials, said additives, and said third phase materials.

17. The wide-range thermistor material as claimed in claim 16, which further comprises a resistance stabilizer of $TiO_2$ and/or $Ti_nO_{2n-1}$ (n=4 to 9).

18. The wide-range thermistor material as claimed in claim 16, in which the mixed phase is dispersed in said matrix to give network, layered and/or linear structures.

19. The wide-range thermistor material as claimed in claim 16, in which the matrix is an aggregate as formed through aggregation of a plurality of crystal grains of the matrix, and said second phase materials, said additions, and said third phase material are dispersed to surround the matrix aggregate.

20. The wide-range thermistor material as claimed in claim 19, in which said matrix aggregate has a particle size between 1 μm and 500 μm.

21. The wide-range thermistor material as claimed in claim 16, in which said third phase has a thickness of from 1 nm to 100 μm.

22. The wide-range thermistor material as claimed in claim 14, which further comprises a resistance stabilizer of $TiO_2$ and/or $Ti_nO_{2n-1}$ (n=4 to 9).

23. The wide-range thermistor material as claimed in claim 5, which further comprises at least one or more additives of nitrides, borides, silicides, sulfides, oxides and carbides of elements of Group IVa to Group VIa and Group IIb to Group Vb, as discontinuously dispersed in the matrix along with said second phase materials to form a mixed phase of said additives and said second phase materials.

24. The wide-range thermistor material as claimed in claim 23, or in which the mixed phase is dispersed in said matrix to give network, layered and/or linear structures.

25. The wide-range thermistor material as claimed in claim 23, in which the matrix is an aggregate as formed through aggregation of a plurality of crystal grains of the matrix, and said second phase materials are dispersed to surround the matrix aggregate.

26. The wide-range thermistor material as claimed in claim 25, in which said matrix aggregate has a particle size between 1 μm and 500 μm.

27. The wide-range thermistor material as claimed in claim 23, in which said matrix is of one or more insulating ceramics selected from oxides, nitrides and their composites of one or more elements of Group Ia to Group VIII and Group Ib to Group Vb.

28. The wide-range thermistor material as claimed in claim 23, in which said second phase materials are of at least one of α-SiC, β-SiC, α-SiC doped with a P-type element, β-SiC doped with a P-type element, semiconductive compounds and their composites.

29. The wide-range thermistor material as claimed in claim 23, which further comprises a resistance stabilizer of $TiO_2$ and/or $Ti_nO_{2n-1}$ (n=4 to 9).

30. The wide-range thermistor material as claimed in claim 5, which further comprises a resistance stabilizer of $TiO_2$ and/or $Ti_nO_{2n-1}$ (n=4 to 9).

31. The wide-range thermistor material as claimed in claim 30, in which said resistance stabilizer is added in an amount of from 0.01 to 40% by volume.

32. The wide-range thermistor material as claimed in claim 5, wherein said second phase materials are one or more ceramics selected from the group consisting of carbides, silicides, nitrides, borides, sulfides and oxides.

33. The wide-range thermistor material as claimed in claim 5, wherein said second phase material are at least one selected from the group consisting of α-SiC, β-SiC, SiC doped with a P-type element, fluorite-structured, spinel-structured, NiO-structured, perovskite-structured, corundum-structured, rutile-structured, ZnO-structured, $CaWO_4$-structured, α-$Al_2O_3$-structured, NaCl-structured and $Cu_2O$-structured oxides of elements of Group Ia to (Group VIIa, oxides and composite oxides selected from $CoAl_4O_4$, $NiAl_2O_4$, $ZnFe_2O_4$, $NiFe_2O_4$, $MgAl_2O_4$, $MgFe_2O_4$, $MgCr_2O_4$, $BaTiO_3$, $SrTiO_3$, $LaCrO_3$, $PbCrO_3$, $Cr_2O_3$, $ZrO_2$, $ReO_3$, $La_2O_3$, $LaTiO_3$, $CaMnO_3$, $LaMnO_3$, $CaCrO_3$, $NiFeO_3$, $SrCrO_3$, $Ca_2O$, $ZnO$, $CaO$, $MnO$, $NiO$, $NiO_2$ and $CuO$, other oxides of transition metals and their composites.

34. A method for producing a wide-range thermistor materials,
   said wide-range thermistor material comprising:
      a rate of temperature-dependant resistance change of 10 to $10^4$;
      a matrix formed of an electrically-insulating ceramic; and
      second phase materials discontinuously dispersed in said matrix, and formed of a semiconductive or conductive substance having a large rate of temperature-dependent resistance change;
   wherein said method comprises:
      a step of mixing an insulating ceramic powder and a sintering aid to prepare a matrix powder;
      a step of granulating the matrix powder into particles having a particle size of from 5 to 500 µm;
      a step of mixing a semiconductive or conductive, second phase material powder and at least one semiconductive or conductive additive selected from nitrides, borides, silicides, sulfides and carbides of elements of Group IVa, Group Va, Group VIa, and Group IIb to Group Vb, and their composite compounds to prepare a composite powder;
      a step of mixing the granulated matrix powder and the composite powder, or surrounding the particles of the granulated matrix powder with the composite powder to prepare a mixture powder; and
      a step of shaping and sintering the mixture powder to form a sintered body thereof.

35. The method for producing wide-range thermistor materials as claimed in claim 34, which further comprises a step of heat-treating the sintered body at a temperature falling between 600° C. and 1500° C.

36. The method for producing wide-range thermistor materials as claimed in claim 34, which further comprises a step of adding to and mixing with said composite powder, at least one selected from nitrides, borides, silicides, oxides and carbides of Ti.

37. A method for producing a wide-range thermistor material,
   said wide-range thermistor material comprising:
      a rate of temperature-dependant resistance change of 10 to $10^4$;
      a matrix formed of an electrically-insulating ceramic; and
      second phase materials discontinuously dispersed in said matrix, and formed of a semiconductive or conductive substance having a large rate of temperature-dependent resistance change;
   wherein said method comprises:
      a step of mixing a semiconductive or conductive, second phase material powder and an insulating ceramic matrix powder optionally along with a sintering aid to prepare a composite powder in which the second phase powder has a particle size not larger than ½ of that of the matrix powder; and
      a step of diepressing and sintering the composite powder, in which the sintering step may optionally includes heat treatment for growing crystal grains of the matrix.

* * * * *